United States Patent
Inoue et al.

(10) Patent No.: US 10,189,962 B2
(45) Date of Patent: Jan. 29, 2019

(54) HEAT-SHRINKABLE POLYESTER FILM

(71) Applicant: TOYOBO CO., LTD., Osaka-shi, Osaka (JP)

(72) Inventors: Masafumi Inoue, Tsuruga (JP); Masayuki Haruta, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 292 days.

(21) Appl. No.: 15/116,759

(22) PCT Filed: Jan. 23, 2015

(86) PCT No.: PCT/JP2015/051870
§ 371 (c)(1),
(2) Date: Aug. 4, 2016

(87) PCT Pub. No.: WO2015/118968
PCT Pub. Date: Aug. 13, 2015

(65) Prior Publication Data
US 2016/0347920 A1    Dec. 1, 2016

(30) Foreign Application Priority Data

Feb. 4, 2014    (JP) .................................. 2014-019113
Sep. 9, 2014    (JP) .................................. 2014-183245

(51) Int. Cl.
*B29C 63/00*     (2006.01)
*B32B 27/36*     (2006.01)
(Continued)

(52) U.S. Cl.
CPC ............... *C08J 5/18* (2013.01); *B29C 55/005* (2013.01); *B29C 55/14* (2013.01); *B29C 55/143* (2013.01);
(Continued)

(58) Field of Classification Search
CPC ..... B29C 61/003; B29C 61/02; B29C 61/025; B29C 55/12; B29C 55/16; B29C 55/165;
(Continued)

(56) References Cited

U.S. PATENT DOCUMENTS

2009/0270584 A1* 10/2009 Endo ..................... B29C 55/146
528/308.1
2011/0008607 A1    1/2011 Haruta et al.

FOREIGN PATENT DOCUMENTS

JP    2000-178367 A    6/2000
JP    2007-016120 A    1/2007
(Continued)

OTHER PUBLICATIONS

Japanese Patent Office, International Search Report in Japanese Patent Application No. PCT/JP2015/051870 (dated Apr. 14, 2015).

*Primary Examiner* — Lee E Sanderson
(74) *Attorney, Agent, or Firm* — Leydig, Void & Mayer, Ltd.

(57) ABSTRACT

A heat-shrinkable polyester film comprising ethylene terephthalate as a main component, containing not less than 0 mol % and not more than 5 mol % of a monomer component capable of serving as an amorphous component relative to the total of a polyester resin component, and having a main shrinkage direction in a lengthwise direction, wherein the heat-shrinkable polyester film satisfies heat shrinkage characteristics of the width direction and the lengthwise direction and the molecular orientation angle difference which is a difference between a molecular orientation angle of an edge of one end in the width direction and a molecular orientation angle of an edge of the other end.

6 Claims, 2 Drawing Sheets

(51) Int. Cl.
*B32B 37/14* (2006.01)
*B32B 7/06* (2006.01)
*C08J 5/18* (2006.01)
*B29C 61/00* (2006.01)
*B29C 55/00* (2006.01)
*B29C 55/14* (2006.01)
*B29C 55/16* (2006.01)
*B29C 63/40* (2006.01)
*B32B 37/18* (2006.01)
*B29C 63/02* (2006.01)
*B29K 67/00* (2006.01)
*B29C 63/42* (2006.01)
*B29K 667/00* (2006.01)
*B29L 31/00* (2006.01)

(52) U.S. Cl.
CPC ............ *B29C 55/16* (2013.01); *B29C 61/003* (2013.01); *B29C 63/0017* (2013.01); *B29C 63/40* (2013.01); *B32B 7/06* (2013.01); *B32B 27/36* (2013.01); *B32B 37/144* (2013.01); *B32B 37/182* (2013.01); *B29C 63/423* (2013.01); *B29K 2067/00* (2013.01); *B29K 2067/003* (2013.01); *B29K 2667/00* (2013.01); *B29K 2995/0049* (2013.01); *B29L 2031/712* (2013.01); *B32B 2367/00* (2013.01); *B32B 2553/00* (2013.01); *C08J 2367/00* (2013.01); *C08J 2367/02* (2013.01); *C08J 2467/02* (2013.01)

(58) Field of Classification Search
CPC ..... B29C 55/055; B29C 55/14; B29C 55/143; B29C 55/005; B29C 55/065; B29C 63/38; B29C 63/40; B29C 63/42; B29C 63/44; B29C 63/46; Y10T 428/91; Y10T 428/1328; B65D 65/02; B65D 23/0878; B29L 2031/744
USPC ................................................ 428/35.7, 480
See application file for complete search history.

(56) References Cited

FOREIGN PATENT DOCUMENTS

| | | |
|---|---|---|
| JP | 2008-274160 A | 11/2008 |
| JP | 2009-143043 A | 7/2009 |
| JP | 2009-226935 A | 10/2009 |
| JP | 2009-226939 A | 10/2009 |
| JP | 4411556 A | 2/2010 |

* cited by examiner

HEAT-SHRINKABLE POLYESTER FILM

CROSS-REFERENCE TO RELATED APPLICATIONS

This patent application is the U.S. national phase of International Patent Application No. PCT/JP2015/051870, filed Jan. 23, 2015, which claims the benefit of Japanese Patent Application No. 2014-019113, filed on Feb. 4, 2014, and Japanese Patent Application No. 2014-183245, filed on Sep. 9, 2014, which are incorporated by reference in their entireties herein.

TECHNICAL FIELD

The present invention relates to a heat-shrinkable polyester film and a package and, more specifically, to a heat-shrinkable polyester film which is a film suitable for uses for labels and banding to fasten lunch boxes, which does not contain a large quantity of an amorphous component as a monomer component making up the polyester, and which exhibits very few flaws on the film surface thereof.

BACKGROUND ART

In recent years, stretched films (so-called heat-shrinkable films) of polyvinyl chloride resins, polystyrene resins, polyester resins, and so forth have widely been used for uses as wrapping labels for protecting glass bottles and PET bottles and for indication purposes, cap seals, assembling packaging, and so forth. Among such heat-shrinkable films, polyvinyl chloride films have problems of low heat resistance, and generation of hydrogen chloride gas or dioxins at the time of incineration. Further, polystyrene films have problems of inferior solvent resistance, necessity of using special ink compositions at the time of printing, necessity of being incinerated at high temperature, and generation of a large quantity of black smoke accompanied with foul smell at the time of incineration. Heat-shrinkable films of polyesters having high heat resistance, that is easy to be incinerated and excellent in solvent resistance, therefore, tend to be used widely as shrinkable labels, and thus the use amount tends to be increased along with increase of the distribution amount of PET containers.

Those which can be shrunk greatly in the width direction have popularly been used as common heat-shrinkable polyester films. Such heat-shrinkable polyester films having a main shrinkage direction in the width direction are often stretched at a high ratio in the width direction to develop shrinkage characteristics in the width direction, but are subjected to stretching at only a low ratio in the lengthwise direction orthogonal to the main shrinkage direction, or sometimes not stretched. As described above, films which are subjected only to stretching at a low ratio in the lengthwise direction and films which are stretched only in the width direction have a defect that the films are inferior in the mechanical strength in the lengthwise direction.

In the case of being used as a label film for bottles or a banding film for bundling lunch boxes, films have to be heat-shrunk after circularly fit on a bottle or a lunch box. Therefore, when being fit on a bottle or a lunch box as a banding film, heat-shrinkable films which can be heat-shrunk in the width direction have to be formed in a circular body in a manner that the width direction is the circumferential direction, and then the circular body has to be cut at every prescribed length and fit on a bottle or a lunch box manually. Consequently, it is difficult for label films or banding films made of heat-shrinkable films which are heat-shrunk in the width direction to be fit on bottles or lunch boxes at a high speed. For this reason, those which have recently been desired are films which can be heat-shrunk in the lengthwise direction and which are therefore suitable for being directly wound around and fit on the circumference of a bottle or a lunch box from a film roll and then heat-shrunk in the lengthwise direction. There is no need to carry out a center sealing step of forming a film tubular body and sealing the tubular body or processing such as cutting and manual covering, and high speed fitting is made possible.

Further, from an environment aspect, films made from a recycled raw material of PET bottles are highly desired. Since common heat-shrinkable polyester films are produced by using a raw material containing a large quantity of an amorphous component for providing shrinkage characteristics, the ratio of the recycled raw material to be mixed is limited, and it is impossible to provide heat-shrinkable polyester films containing a large quantity of a recycled raw material.

For example, an ideal heat-shrinkable polyester film which has a main shrinkage direction in the vertical direction and high mechanical strength in vertical and transverse directions is known (see Patent Document 1). However, the film contains not less than 10 mol % of one or more kinds of monomer components, which are capable of serving as amorphous components, relative to the total of the polyester resin components, and the upper limit of addition ratio of the recycled raw material is thus spontaneously limited.

Further, in terms of the requirement for appearance of a film after shrinkage, it is required that distortion after shrinkage is slight. It is known that distortion after shrinkage is caused due to tilt of the main orientation direction of molecules of a film from the lengthwise direction or the width direction of the film. In terms of distortion, the tilt of orientation of molecules is ideally slight from the center part to the end part of a film.

Further, in terms of the appearance of a shrunk film, it is desired that the number of flaws on the film surface is small. A flaw on the film surface causes defects such as print omission at the time of printing on the film. Generally, at the time of heat-stretching a film, it is necessary for the film to be heated to a temperature not less than Tg, but a film at a temperature not less than Tg generates a flaw on the film surface due to friction by rolls of a film formation machine when brought into contact with the rolls or shift of the film. In the case where a common vertical stretching machine is used, a film is heated while being brought into contact with a roll at a temperature as high as a temperature not less than Tg, so that a flaw tends to be caused easily.

For example, in the case of Patent Document 1, many flaws are formed by bringing a film into contact with a plurality of rolls at a high temperature not less than Tg of the film in a vertical stretching machine to be used for film production, and it is therefore not preferable in terms of the appearance. Further, since neck-in occurs abruptly only in the peripheries of end parts, the difference of molecular orientation angle is significant in the peripheries of end parts, and the molecular orientation angle is wide. Therefore, when the film portions near the end parts are shrunk, distortions are caused, and it is not preferable in terms of the appearance.

PRIOR ART DOCUMENT

Patent Document

Patent Document 1: Japanese Patent No. 4411556

SUMMARY OF THE INVENTION

Problems to be Solved by the Invention

An object of the present invention is to solve the problems in Patent Document 1 and to provide a heat-shrinkable polyester film having sufficient heat shrinkage characteristics in the main shrinkage direction, which is the lengthwise direction, a low shrinkage ratio in the width direction orthogonal to the main shrinkage direction, very few flaws on the film surface, high mechanical strength, a small molecular orientation angle difference, and little thickness unevenness even without containing a large quantity of a monomer component capable of serving as an amorphous component.

Means for Solving the Problems

That is, the present invention is constituted as follows.
1. A heat-shrinkable polyester film comprising ethylene terephthalate as a main component, containing not less than 0 mol % and not more than 5 mol % of a monomer component capable of serving as an amorphous component relative to the total of a polyester resin component, and having a main shrinkage direction in a lengthwise direction, wherein the heat-shrinkable polyester film satisfies the following requirements (1) to (3):
(1) the heat-shrinkable polyester film has a hot-water heat shrinkage rate in the lengthwise direction of not less than 15% and not more than 60% when being treated in hot water at 90° C. for 10 seconds;
(2) the heat-shrinkable polyester film has a hot-water heat shrinkage rate in a width direction orthogonal to the lengthwise direction of not less than −10% and not more than 10% when being treated in hot water at 90° C. for 10 seconds; and
(3) the heat-shrinkable polyester film has an orientation distortion index that is a molecular orientation angle difference, the difference being a difference between a molecular orientation angle of an edge of one end in the width direction and a molecular orientation angle of an edge of the other end, per 1 m of the film of not more than 15°/m.
2. The heat-shrinkable polyester film according to above 1, wherein the heat-shrinkable polyester film has, in a surface thereof, not more than 100 flaws/m$^2$ with a depth of not less than 1 μm and a length of not less than 3 mm.
3. The heat-shrinkable polyester film according to above 1 or 2, wherein a thickness unevenness in the lengthwise direction of the heat-shrinkable polyester film is not more than 10%.
4. The heat-shrinkable polyester film according to any one of above 1 to 3, wherein the heat-shrinkable polyester film has a tensile strength at break in the width direction orthogonal to the main shrinkage direction of not less than 80 MPa and not more than 200 MPa.
5. The heat-shrinkable polyester film obtained by stretching an unstretched film in a width direction and thereafter stretching the film in a lengthwise direction, and satisfying any one of above 1 to 4, wherein the heat-shrinkable polyester film is stretched in the lengthwise direction without using a roll heated to a temperature not less than Tg of the film.
6. A package obtained by using the heat-shrinkable polyester film according to any one of above 1 to 5 as a base material for a label or a banding film, wherein the label or the banding film is covered on at least a portion of an outer circumference and heat-shrunk.

Effect of the Invention

According to the present invention, it is made possible to solve the problems of Patent Document 1, and to provide a heat-shrinkable polyester film which has sufficient heat shrinkage characteristics in the main shrinkage direction, which is the lengthwise direction, a low shrinkage ratio in the width direction orthogonal to the main shrinkage direction, very few flaws on the film surface, and high mechanical strength as well as a small molecular orientation angle difference in the width direction, and little thickness unevenness even without containing a large quantity of a monomer component capable of serving as an amorphous component. Further, it is made possible to provide a heat-shrinkable polyester film with high environment responsiveness and containing a large quantity of a polyester obtained by using a PET bottle recycled polyester or a bio-derived raw material, since there is no need to add a large quantity of a monomer component capable of serving as an amorphous component to raw materials. The heat-shrinkable polyester film of the present invention made it possible to obtain excellent appearance, since there are very few flaws existing on the surface. The heat-shrinkable polyester film of the present invention can be used preferably for film labels of bottles, can be considerably efficiently fit on a bottle within a short time, and can provide good finishing without insufficient shrinkage and longitudinal sink marks and with a very few wrinkles in the case of being fit on a bottle and then heat-shrunk. Further, the heat-shrinkable polyester film of the present invention can be used preferably as banding films for bundling a container such as a lunch box, and made it possible to be very efficiently fit the film on a bottle within a short time and to give good finishing with a very few wrinkles attributed to heat shrinkage, distortion, or insufficient shrinkage in the case of being fit on a container and then heat-shrunk.

MODE FOR CARRYING OUT THE INVENTION

Figure 1:
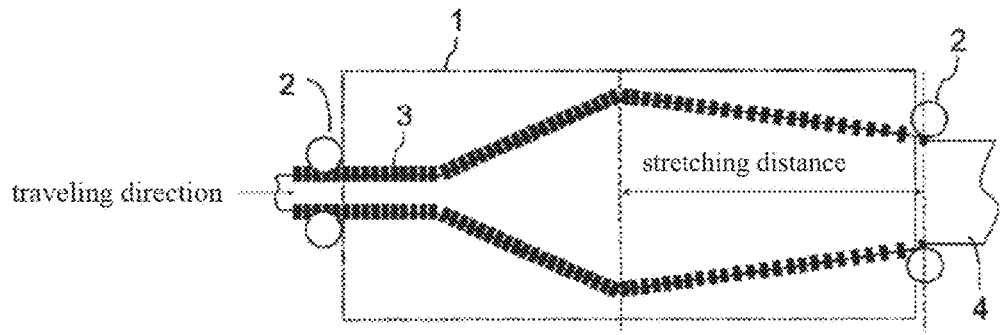
FIG. 1 is a plan view schematically showing an outline of a stretching manner A.

A preferable production method for continuously producing a heat-shrinkable polyester film described in any one of the above-mentioned items 1 to 5 involves stretching an unstretched polyester film containing ethylene terephthalate as a main component and containing not less than 0 mol % and not more than 5 mol % of a monomer component capable of serving as an amorphous component in the total of polyester resin components at a temperature not less than Tg of the film and not more than Tg+40° C. and at a stretch (transverse stretching) ratio of not less than 3.5 times and not more than 6 times in the width direction by using a simultaneous biaxial stretching machine in a state where both ends in the width direction are held by clips, thereafter stretching the film at a stretch (vertical stretching) ratio of not less than 1.5 times and not more than 2.5 times in the lengthwise direction by widening the interval between the clips at a temperature not less than Tg of the film and not more than Tg+40° C., and at the same time, relaxing the film by narrowing the tenter width by not less than 5% and not more than 30% in the width direction after the transverse stretching (hereinafter, this stretching manner is referred to as a stretching manner A).

Further, one of production methods to cause an effect similar to that of the above-mentioned production method involves stretching an unstretched polyester film similar to that described above at a temperature not less than Tg of the film and not more than Tg+40° C. and at a stretch (transverse stretching) ratio of not less than 3.5 times and not more than 6 times in the width direction in the inside of a tenter in a state where both ends in the width direction are held by clips, and thereafter stretching the film in the inside of the tenter at a temperature not less than Tg of the film and not more than Tg+40° C. and at a stretch (vertical stretching) ratio of not less than 1.5 times and not more than 2.5 times in the lengthwise direction using speed difference between the clips of the tenter and rolls near the exit, by opening the clips which hold the end parts of the film in the tenter and transmitting the tension of the rolls installed near the exit of the tenter. Since the vertical stretching is carried out in a state where the film is not held in the width direction, the width of the film is narrowed by not less than 5% and not more than 30% (hereinafter, this stretching manner is referred to as a stretching manner B).

Further, one of production methods to cause an effect similar to that of the above-mentioned two production methods involves stretching an unstretched polyester film similar to that described above at a temperature not less than Tg of the film and not more than Tg+40° C. and at a stretch (transverse stretching) ratio of not less than 3.5 times and not more than 6 times in the width direction in the inside of a tenter in a state where both ends in the width direction are held by clips, and thereafter stretching the film at a stretch (vertical stretching) ratio of not less than 1.5 times and not more than 2.5 times in the lengthwise direction using speed difference between the rolls at the inlet and the outlet of another tenter while heating the film again at a temperature not less than Tg of the film and not more than Tg+40° C. in the inside of the tenter. Since the vertical stretching is carried out in a state where the film is not held in the width direction, the width of the film is narrowed by not less than 5% and not more than 30% (hereinafter, this stretching manner is referred to as a stretching manner C).

The film of the present invention is one containing ethylene terephthalate as a main component. Herein, the main component means that the amount of ethylene terephthalate is not less than 95 mol % in all the constituent components of the polymer making up the film. Use of ethylene terephthalate as the main component makes the film be provided with excellent mechanical strength and transparency.

All the constituent components of the polymer making up the film may be ethylene terephthalate, and a polymerization method applicable to such polyethylene terephthalate (hereinafter, sometimes simply referred to as PET) may be any production method such as a direct polymerization method of causing a direct reaction of terephthalic acid with ethylene glycol as well as another dicarboxylic acid component and another diol component if necessary, and a transesterification method of causing a transesterification reaction of terephthalic acid with dimethyl ester (including another dicarboxylic acid methyl ester if necessary) as well as ethylene glycol (including another diol component if necessary).

The intrinsic viscosity of polyethylene terephthalate is preferably in a range from 0.45 to 0.8. If the intrinsic viscosity is less than 0.45, crystallization occurs and the shrinkage characteristics are deteriorated due to stretching, and therefore it is not preferable. On the other hand, if the intrinsic viscosity is more than 0.8, increase of filtration pressure is significant, and high precision filtration is difficult, and therefore it is not preferable.

A PET bottle recycled raw material may be used as PET in the present invention (hereinafter, sometimes simply referred to as a recycled raw material). A recycled raw material generally contains PET as a constituent component, and commonly contains a small amount of isophthalic acid as a monomer component for improving the moldability at the time of formation into PET bottles. In the present invention, a polymer raw material containing a large amount of a monomer component capable of serving as an amorphous component is not used in a large quantity. Since the recycled raw material may contain isophthalic acid, it is described that an amorphous monomer is contained in a content range from not less than 0 mol % and not more than 5 mol %.

Monomers capable of serving as an amorphous component may be typically isophthalic acid, and examples of the monomers also include neopentyl glycol, 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol, and hexanediol. These may be contained in the above-mentioned content range.

Further, in the present invention, a polyester raw material containing ethylene glycol produced from a plant-derived raw material as a glycol component (hereinafter, sometimes simply referred to as a bio-polyester raw material) may be used.

Still further, the heat-shrinkable polyester film of the present invention preferably has a heat shrinkage rate (that is, a hot-water heat shrinkage rate at 90° C.) of not less than 15% and not more than 60% in the lengthwise direction of the film calculated according to the following equation 1 from the length before and after shrinkage when the film is treated in hot water at 90° C. in a no-load state for 10 seconds.

Heat shrinkage rate={(length before shrinkage−length after shrinkage)/length before shrinkage}×100 (%)   equation 1

If the hot-water heat shrinkage rate at 90° C. in the lengthwise direction is less than 15%, due to the low shrinkage quantity, wrinkles and slacks are formed in a label after heat shrinkage, and it is not preferable in the case where the film is used as a banding film. On the other hand, it is not particularly a problem that the hot-water heat shrinkage rate at 90° C. in the lengthwise direction exceeds 60%, but the upper limit of the heat shrinkage rate is generally about 60% in the present invention. The lower limit of the hot-water heat shrinkage rate at 90° C. in the lengthwise direction is preferably 20%, more preferably 25%, and particularly preferably 30%.

Further, the heat-shrinkable polyester film of the present invention preferably has a hot-water heat shrinkage rate of not less than −10% and not more than 10% in the width direction of the film calculated according to the above-mentioned equation 1 from the length before and after shrinkage when the film is treated in hot water at 90° C. in a no-load state for 10 seconds. If the hot-water heat shrinkage rate at 90° C. in the width direction exceeds 10%, the length of the film in the direction orthogonal to the shrinkage direction at the time of heat shrinkage is short and therefore, it is not preferable in the case where the film is used as a label or a banding film. On the other hand, if the hot-water heat shrinkage rate is less than −10%, the length of the label in the direction orthogonal to the main shrinkage direction is long and slacks are generated to easily form wrinkles at the time of heat shrinkage and therefore, it is not preferable. The hot-water heat shrinkage rate at 90° C. in the width direction is preferably not less than −9% and not more than 9%, more preferably not less than −8% and not more than 8%, and particularly preferably not less than −7% and not more than 7%.

Further, in the case where an orientation distortion index, which is the molecular orientation angle difference, the difference being a difference between the molecular orientation angle of an edge of one end in the film width direction and the molecular orientation angle of an edge of the other end, per 1 m of the film width, is calculated by the following method, the heat-shrinkable polyester film of the present invention preferably has an orientation distortion index of not more than 15°/m. The upper limit of the orientation distortion index is preferably not more than 13°/m, and further preferably not more than 12°/m. As the orientation distortion index is closer to 0°/m, it is better, but it may be 1°/m without any particular problem.

In the case where the lengthwise direction of the film is regarded as x-axis, the width direction of the film is regarded as y-axis, and the thickness direction of the film is regarded as z-axis, in the present invention, the direction in which the molecular orientation degree is highest in the x-y plane of the film is called as the molecular orientation axis. The molecular orientation angle means an angle of the molecular orientation axis shifted from the film lengthwise direction or from the film width direction in the case where the molecular orientation axis is measured. The method for measuring the molecular orientation angle includes first sampling a rectangular sample in right and left edges of ends of a film opposing each other in the width direction. The molecular orientation angle (angle in the molecular orientation axis direction) of the cut film sample is measured with a molecular orientation angle measurement apparatus (MOA-6004) manufactured by Oji Scientific Instruments Co., Ltd. The molecular orientation angle is measured by setting the lengthwise direction of the film to be at 0 degrees, and as the difference of the angle in the direction of the molecular orientation axis from 0 degrees in the case where the direction of the molecular orientation axis is less than 45 degrees on the basis of the lengthwise direction, and as the difference from 90 degrees in the case where the direction is more than 45 degrees. Regarding the rectangular samples sampled from the right and left edges of ends of the film opposing each other in the width direction, the molecular orientation angle is measured by the above-mentioned method, and the absolute value of the difference is divided by the interval between the cut positions (center parts) of the samples in the width direction to calculate the difference (orientation distortion index) of the molecular orientation angle per film unit width (1 m) according to the following equation 2.

Orientation distortion index=(absolute value of difference of molecular orientation angles between samples sampled from right and left edges of ends)÷(interval between cut positions of samples)    equation 2

In the case where common biaxial stretching is carried out, since the difference of the molecular orientation angles in the center parts of the film in the width direction is extremely slight, the orientation distortion index is not more than 15°/m. On the other hand, the difference of molecular orientation in the peripheries of film edges is significant, the orientation distortion index exceeds 15°/m. This is attributed to occurrence of nick-in only in the periphery of the edges since drastic stretching in a short stretching distance is carried out.

At the time of film formation, the film heated to a temperature not less than Tg generates a flaw on the film surface due to friction with rolls and shift of the film when being brought into contact with rolls of a film formation machine. It is preferable that the number of flaws with a depth of not less than 1 μm and a length of not less than 3 mm and existing in the surface of the heat-shrinkable polyester film of the present invention is not more than 100 flaws/m$^2$. If the number of flaws exceeds 100 flaws/m$^2$, the appearance such as designs of the film may be deteriorated and therefore, it is not preferable. Herein, the number of flaws is more preferably not more than 90 flaws/m$^2$, furthermore preferably not more than 80 flaws/m$^2$, and the lower limit is, of course, 0 flaws/m$^2$.

In addition, the thickness unevenness in the lengthwise direction of the heat-shrinkable polyester film of the present invention is preferably not more than 10%. If the thickness unevenness in the lengthwise direction exceeds 10%, printing unevenness tends to occur easily at the time of printing in the case where labels and banding films are produced, and shrinkage unevenness tends to occur easily after heat shrinkage, and it is therefore not preferable. The thickness unevenness in the lengthwise direction is more preferably not more than 9%, furthermore preferably not more than 8%, and particularly preferably not more than 7%. As the thickness unevenness in the lengthwise direction is closer to 0%, it is better, and practically, the lower limit may be 2%.

The tensile strength at break in the width direction of the heat-shrinkable polyester film of the present invention is preferably not less than 80 MPa and not more than 200 MPa. A method for measuring the tensile strength at break will be explained in Examples. When the tensile strength at break is below 80 MPa, "rigidity" (stiffness) is weak in the case where the film is covered on a container as application for labels or application for banding films, and it is therefore not preferable. Contrarily, when the tensile strength at break exceeds 200 MPa, the cutting property (ease of tearing) in the initial stage is poor in the case where the labels and banding films are torn. Herein, the lower limit of the tensile strength at break is more preferably not less than 100 MPa, furthermore preferably not less than 110 MPa, and particularly preferably not less than 120 MPa, and the upper limit is more preferably not more than 190 MPa, furthermore preferably not more than 180 MPa, and particularly preferably not more than 170 MPa.

The thickness of the heat-shrinkable polyester film of the present invention is not particularly limited, but it is preferably 5 to 100 µm and more preferably 10 to 95 µm as a heat-shrinkable film for application for labels and application for banding.

The heat-shrinkable polyester film of the present invention is not at all limited in its production method, and can be produced by, for example, forming an unstretched film by melt-extrusion of the above-mentioned polyester raw material with an extruder, and biaxially stretching the unstretched film by the following method.

At the time of melt extrusion of a raw material resin, the polyester raw material is preferably dried with a drier or a vacuum drier such as a hopper drier and a paddle drier. After the polyester raw material is dried in such a manner, the raw material is melted and extruded into a film form at a temperature of 200 to 300° C. by using an extruder. At the time of such extrusion, any of existing methods such as a T-die method and a tubular method may be employed.

An unstretched film can be obtained by quenching the sheet-like molten resin after the extrusion. Herein, as a method for quenching the molten resin, it is preferable to employ a method of casting the molten resin on a rotating drum out of a metal cap, and quenching and solidifying the resin to obtain a substantially unoriented resin sheet.

Further, as described below, the obtained unstretched film is stretched in the width direction under prescribed conditions, and thereafter stretched in the lengthwise direction under prescribed conditions, whereby the heat-shrinkable polyester film of the present invention can be obtained. Herein, biaxial stretching preferably employed to obtain the heat-shrinkable polyester film of the present invention will be described in detail in consideration of a difference of the biaxial stretching from a conventional heat-shrinkable polyester film stretching method.

(Preferable Stretching Method for Heat-shrinkable Polyester Film)

A common heat-shrinkable polyester film is produced by stretching an unstretched film in a direction desired to shrink the film. Heat-shrinkable polyester films which can be shrunk in the lengthwise direction have conventionally been desired, but mere stretching an unstretched film in the lengthwise direction considerably lowers the tensile strength at break in the width direction, and also a wide film cannot be produced and therefore, it is not preferable in terms of productivity. Further, a common heat-shrinkable polyester film is obtained by using a raw material containing a large quantity of an amorphous component to provide heat shrinkage characteristics, so that the ratio of a recycled raw material to be added is limited.

Patent Document 1 discloses a method of stretching an unstretched film by transverse stretching, heat treatment, and vertical stretching in this order under prescribed conditions to improve the mechanical properties in the lengthwise direction and the width direction. However, in this method, an amorphous monomer as a diol or a dicarboxylic acid of PET raw materials is contained in an amount of not less than 10 mol % and therefore, addition of a recycled raw material is limited. Further, in the film formation method described in Patent Document 1, the orientation distortion index is large and the orientation angle is large in the end parts, so that distortion is caused at the time of winding the film around a container such as a lunch box and shrinking the film and therefore, it is not preferable. Furthermore, since the film is brought into contact with a plurality of rolls of a vertical stretching machine at a temperature not less than film Tg, there occurs a problem that a large number of flaws are formed on the surface by friction between the film and the rolls and shift of the film.

A method for lowering the orientation distortion index and eliminating the distortion due to shrinkage will be described below. As a result of research, the present invention makes it possible to lower the orientation distortion index by setting the vertical stretching distance considerably longer than a conventional distance, and uniformly causing a neck-in phenomenon, which is caused at the time of vertical stretching, in the width direction of the film. The neck-in is a phenomenon of shrinkage of a film in the width direction due to the force generated in the direction (width direction) orthogonal to the stretching direction at the time of vertical stretching. In the case of vertical stretching in a conventional vertical stretching machine, stretching is carried out between low speed rolls and high speed rolls (about several mm), so that the effect of neck-in may be caused only in the peripheries of end parts of the film, and drastic neck-in may occur in the lengthwise direction. Accordingly, the orientation angle near the end parts is considerably increased, and the orientation distortion index increases. In the present invention, the stretching distance of the vertical stretching is set to be considerably long, and the effect of neck-in can be caused in the entire width, and neck-in is caused moderately in the lengthwise direction. This realizes lowering of the orientation distortion index.

Figure 2:
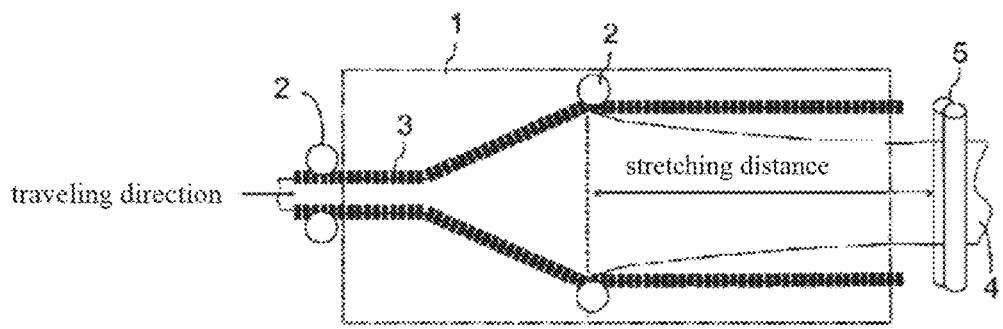
FIG. 2 is a plan view schematically showing an outline of a stretching manner B.
Figure 3:
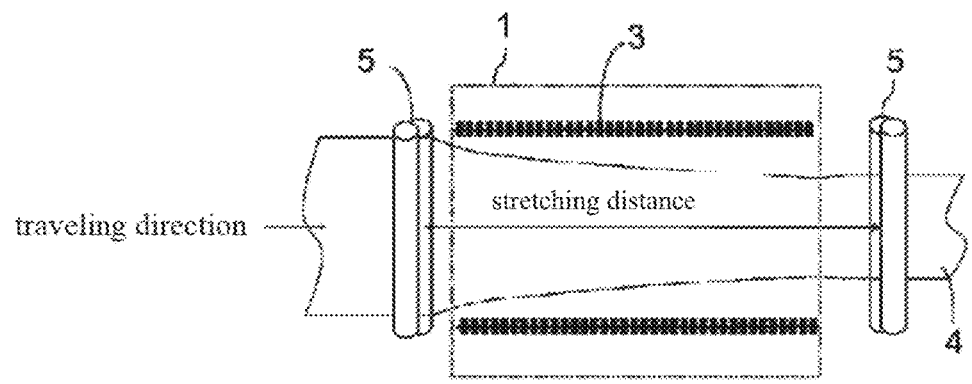
FIG. 3 is a plan view schematically showing an outline of a stretching manner C.

A method of stretching a film while causing uniform neck-in by setting the stretching distance in the lengthwise direction to be considerably long will be described hereinafter. In the stretching manner A, it is made possible to uniformly cause neck-in by stretching the film in the lengthwise direction with the interval between the clips widened, and gradually narrowing the tenter width. On the other hand, in the stretching manner B, since the film is stretched between rolls installed near the tenter's outlet from the time when the film is released from the clips in the tenter, the stretching distance can be made long, and neck-in can be caused uniformly. Further, in the stretching manner C, it is made possible to make the stretching distance long and cause neck-in uniformly, since stretching is carried out by rolls near the inlet of the tenter and rolls near the outlet thereof. FIG. 1 shows the stretching manner A; FIG. 2 shows the stretching manner B; and FIG. 3 shows the stretching manner C.

A stretching manner for considerably lessening flaws formed in the surface will be described hereinafter. As a result of researches, the inventors of the present invention found a method for forming a shrinkable film which can be stretched in the lengthwise direction without being brought into contact with rolls at a temperature not less than Tg of the film, and accordingly made it possible to considerably lessen flaws in the film surface. It is found that a film having sufficient shrinkage characteristics can be formed without being brought into contact with rolls at a temperature not less than Tg by carrying out transverse stretching by using a simultaneous biaxial stretching machine and thereafter carrying out stretching in the lengthwise direction by widening the distance between clips, as described in the above-mentioned stretching manner A. Further, it is found that a shrinkable film can be formed without being brought into contact with rolls at a temperature not less than Tg also in the case where stretching in the lengthwise direction is carried out by opening the holding clips in the inside of the tenter after the transverse stretching and transmitting the tensile force of the rolls installed near the outlet of the tenter, as described in the above-mentioned stretching manner B. Still further, formation of a cooling zone for positively cooling the film before the film comes out of the outlet of the tenter can lower the temperature of the film not more than Tg at the time the film is brought into contact with rolls. Further, as described in the above-mentioned stretching manner C, introduction of a film into a tenter without holding the film by clips and execution of stretching in the lengthwise direction in the tenter by the difference of the speed of rolls installed near the inlet and near the outlet of the tenter is found to be capable of forming a film with sufficient shrinkage characteristics without being brought into contact with the rolls at a temperature not less than Tg. Still further, similarly to the stretching manner B, formation of a cooling zone for positively cooling the film before the film comes out of the outlet of the tenter can lower the temperature of the film to a temperature not more than Tg at the time the film is brought into contact with rolls.

A preferable stretch ratio in the width direction, a preferable stretch ratio in the lengthwise direction, a preferable stretching distance, and a preferable width shrinkage ratio at the time of vertical stretching of the heat-shrinkable film of the present invention will be described below.

According to the results of research, the inventors of the present invention have found that the shrinkage ratio of a film intentionally containing no amorphous PET raw material in the stretching direction is high (a stretch ratio is around 2 times), and that the shrinkage ratio in the stretching direction lowers when the stretch ratio is controlled to be not less than 3 times since crystallization proceeds. According to the research results, it is preferable to carry out stretching at a first transverse stretch ratio of not less than 3.5 times and not more than 6 times for shrinkage in the lengthwise direction after biaxial stretching. If the ratio is less than 3.5 times, the shrinkage ratio in the width direction increases, and defects such as wrinkles are generated at the time of shrinkage of the film as a label or a banding film, and it is therefore not preferable. Further, in the case where an unstretched film is stretched in the lengthwise direction without being stretched in the width direction, the thickness unevenness in the vertical direction is significant, and it is therefore not preferable. The upper limit of the transverse stretch ratio is not particularly limited, but if it is more than 6 times, stretching in the lengthwise direction becomes difficult (that is, the film is easily broken), and it is therefore not preferable. The upper limit is more preferably not less than 3.7 times and not more than 5.8 times, and furthermore preferably not less than 3.9 times and not more than 5.6 times. The stretch ratio in the lengthwise direction is preferably not less than 1.5 times and not more than 2.5 times. If the stretch ratio is not more than 1.5 times, the shrinkage ratio is insufficient, and if it is not less than 2.5 times, the width shrinkage ratio is so high at the time of vertical stretching that the shrinkage ratio in the width direction is considerably reduced, so that defects such as wrinkles or the like may be generated at the time of shrinkage of the film as a label or a handing film, and it is therefore not preferable. The upper limit is more preferably not less than 1.6 times and not more than 2.4 times, and furthermore preferably not less than 1.8 times and not more than 2.3 times.

The stretching distance in the lengthwise direction is preferably not less than 1000 mm and not more than 7000 mm. If the vertical stretching distance is not more than 1000 mm, uniform neck-in in the entire width is not caused at the time of vertical stretching, and it is therefore not preferable. If the vertical stretching distance exceeds 7000 mm, nick-in becomes significant, and the shrinkage ratio in the width direction is considerably lowered, and it is therefore not preferable. The upper limit is more preferably not less than 1500 mm and not more than 6500 mm, and furthermore preferably not less than 2000 mm and not more than 6000 mm.

The quantity of the shrinkage in the width direction caused by neck-in by the vertical stretching is described as "width shrinkage ratio at the time of vertical stretching." The width shrinkage ratio at the time of vertical stretching is expressed as the following equation 3, wherein the width of the film before stretching is defined as X, and the width of the film after stretching is defined as Y.

Width shrinkage ratio at the time of vertical stretching $(\%) = 100(X-Y)/X$ equation 3

The width shrinkage ratio at the time of vertical stretching can be adjusted based on the stretch ratio, vertical stretching distance, and presence or absence of pinch rolls, and it is preferably not less than 5% and not more than 30%. If the width shrinkage ratio is less than 5%, uniform neck-in in the width direction is not caused, and the orientation distortion index cannot be lowered, and it is therefore not preferable. If the width shrinkage ratio exceeds 30%, the shrinkage ratio in the width direction is considerably lowered and the shrinkage is considerably reduced, and defects such wrinkles are caused, and it is therefore not preferable. The width shrinkage ratio is more preferably not less than 7% and not more than 27%, and furthermore preferably not less than 10% and not more than 24%.

The above-mentioned pinch rolls are a kind of nip rolls for pinching the film between rolls and accurately sending the film. Two nip rolls are disposed bilaterally symmetrically in the width direction at the positions of the film's end parts, and slightly tilted in an inverted V-shape to pull the film's both ends outward and sending the film outward.

A package of the present invention is formed by covering at least a portion of the outer circumference of an object to be wrapped with a banding film (and a label) obtained from the heat-shrinkable polyester film of the present invention and heat-shrinking the film. Examples of the object to be wrapped include plastic containers such as lunch boxes (represented by PET bottles for drinks, as wells as various kinds of bottles and cans for confectionery) and paper boxes. In the case where a label obtained from a heat-shrinkable polyester film is heat-shrunk to cover these objects to be wrapped, the banding film (and the label) is usually heat-shrunk at about 5 to 70% and attached closely to a package. Further, the banding film (and the label) to cover an object to be wrapped may be subjected to printing, but does not have to be subjected to printing.

A method for producing a banding film (and a label) may involve rolling a rectangular film in the lengthwise direction, and superposing and adhering end parts to form a label, or rolling a film in the form of a roll in the lengthwise direction, superposing and adhering end parts to form a tubular body, and then cutting the tubular body into a label. A method for adhering the film together may be carried out by conventionally known methods of adhesion using fusion sealing, solvent adhesion, and a hot-melt adhesive, and adhesion with an energy ray-curable adhesive.

EXAMPLES

Hereinafter, the present invention will be described in more detail with reference to examples, but the present invention should not be limited in any way to the modes of examples, and these modes may be properly changed without departing from the scope of the invention. Compositions of raw materials used in examples and comparative examples, and stretching manners and production conditions of films in examples and comparative examples are shown in Table 1.

TABLE 1

| No. | resin composition (weight ratio) | ratio of amorphous monomer (mol %) | stretching manner | transverse stretch ratio | vertical stretch ratio | width shrinkage ratio at the time of vertical stretching(%) | number of rolls at a temperature not less than Tg (-) | presence or absence of pinch roll | film temperature of tenter outlet(° C.) | vertical stretching distance (mm) |
|---|---|---|---|---|---|---|---|---|---|---|
| Example 1 | polyester1/polyester2 = 93/7 | 0 | A | 4 | 2 | 10 | 0 | absence | 55 | 2000 |
| Example 2 | polyester2/polyester3 = 7/93 | 1.9 | A | 4 | 2 | 10 | 0 | absence | 55 | 2000 |
| Example 3 | polyester2/polyester4 = 7/93 | 0 | A | 4 | 2 | 10 | 0 | absence | 55 | 2000 |
| Example 4 | polyester1/polyester2 = 93/7 | 0 | B | 4 | 2 | 15 | 0 | presence | 55 | 4000 |
| Example 5 | polyester1/polyester2 = 93/7 | 0 | B | 4 | 1.5 | 8 | 0 | presence | 55 | 4000 |
| Example 6 | polyester1/polyester2 = 93/7 | 0 | B | 4 | 2.5 | 25 | 0 | presence | 55 | 4000 |
| Example 7 | polyester1/polyester2 = 93/7 | 0 | B | 4 | 2 | 30 | 0 | absence | 55 | 4000 |
| Example 8 | polyester1/polyester2 = 93/7 | 0 | B | 4 | 2 | 18 | 0 | presence | 55 | 5000 |
| Example 9 | polyester1/polyester2 = 93/7 | 0 | B | 4 | 2 | 20 | 0 | presence | 55 | 6000 |
| Example 10 | polyester1/polyester2 = 93/7 | 0 | C | 4 | 2 | 17 | 0 | presence | 55 | 4000 |
| Comparative Example 1 | polyester1/polyester2 = 93/7 | 0 | D | absence | 2 | 2 | 10 | absence | — | 4 |
| Comparative Example 2 | polyester1/polyester2 = 93/7 | 0 | E | 4 | 2 | 2 | 10 | absence | — | 4 |

The evaluation methods for films are as follows.

[Tg (Glass Transition Point)]

Tg was measured according to JIS-K7121-1987 by using a differential scanning calorimeter (model: DSC220) manufactured by Seiko Instruments Inc. An unstretched film in a weight of 5 mg was heated from −40° C. to 120° C. at a temperature increase speed of 10° C./min to obtain a temperature increase profile. The temperature at the crossing point of the extended line of the base line not more than the glass transition temperature and the tangential line showing the maximum inclination in the transition part is defined as the glass transition temperature.

[Intrinsic Viscosity (IV)]

A polyester in an amount of 0.2 g was dissolved in 50 ml of a mixed solvent of phenol/1,1,2,2-tetrachloroethane (60/40 (weight ratio)), and the intrinsic viscosity was measured at 30° C. with an Ostwald's viscometer. The unit is dl/g.

[Heat Shrinkage Rate (Hot-water Heat Shrinkage Rate)]

A film was cut in a square of 10 cm×10 cm and heat-shrunk by treatment for 10 seconds in hot water at a prescribed temperature ±0.5° C. in a no-load state and thereafter, the dimension in the vertical and transverse directions of the film was measured. Each heat shrinkage rate was calculated according to the above-mentioned equation 1. The direction in which the heat shrinkage rate was higher was defined as the main shrinkage direction.

[Orientation Distortion Index]

Two samples each having a dimension of lengthwise direction; width direction=140 mm; 100 mm were sampled in right and left edges of ends opposing each other in the width direction of each film. The molecular orientation angle was measured with a molecular orientation angle measurement apparatus (MOA-6004) manufactured by Oji Scientific Instruments Co., Ltd. for these two samples.

Thereafter, the absolute value of the difference of molecular orientation angles between the samples sampled from the right and left edges of ends was measured, and the orientation distortion index was calculated according to the following equation 2 from the calculation of the difference of molecular orientation angle per unit width (1 m) by dividing the absolute value of the difference by the interval between the cut positions (center parts) of the samples in the film width direction.

Orientation distortion index=(absolute value of difference of molecular orientation angles between samples)÷(interval between cut positions of samples)   equation 2

[Distortion After Shrinkage (Use for Banding Lunch Boxes)]

Figure 4:
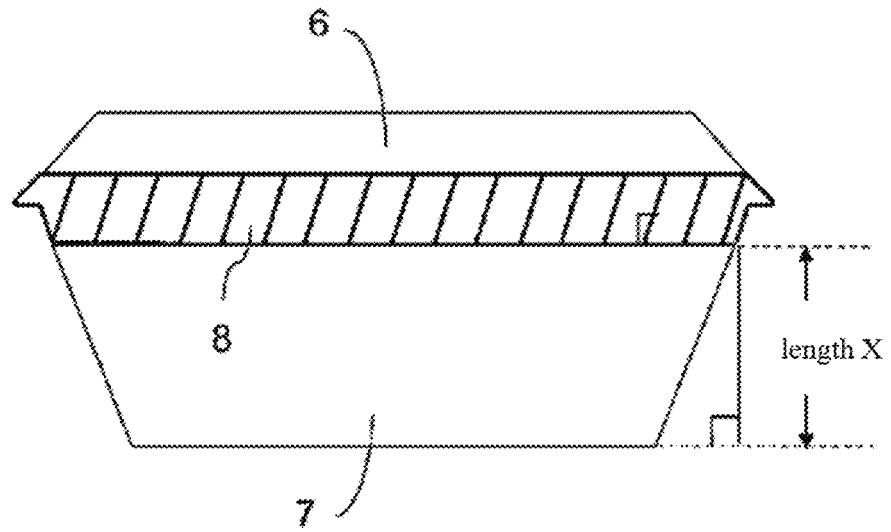
FIG. 4 shows a plastic lunch container with which film distortion is evaluated after shrinkage.

A film was wound around a plastic lunch container (sides 150; 150 mm, height 100 mm) to bind a main body part of the container and a cover with the circumferential direction of the container as the shrinkage direction of the film, sealed by fusion sealing at 220° C., and heat-shrunk in a shrinking tunnel at a set temperature of 90° C. In FIG. 4, the length from the ground on which the plastic container was put to the end of the film was regarded as length X, and the length X was measured at every 5 mm pitch in the circumferential direction (lengthwise direction of the film). The difference between the maximum value and the minimum value of the length X was defined as R. Those with large R were determined to have significant distortion after shrinkage. The criteria were as follows.

⊚: R≤1 mm
○: 1 mm<R≤2 mm
Δ: 2 mm<R≤3 mm
×: 3 mm<R

The above-mentioned evaluation was carried out on two samples in the center part and end part of each of the produced film rolls.

[Distortion After Shrinkage (Use for Labels for Bottles)]

Figure 5:
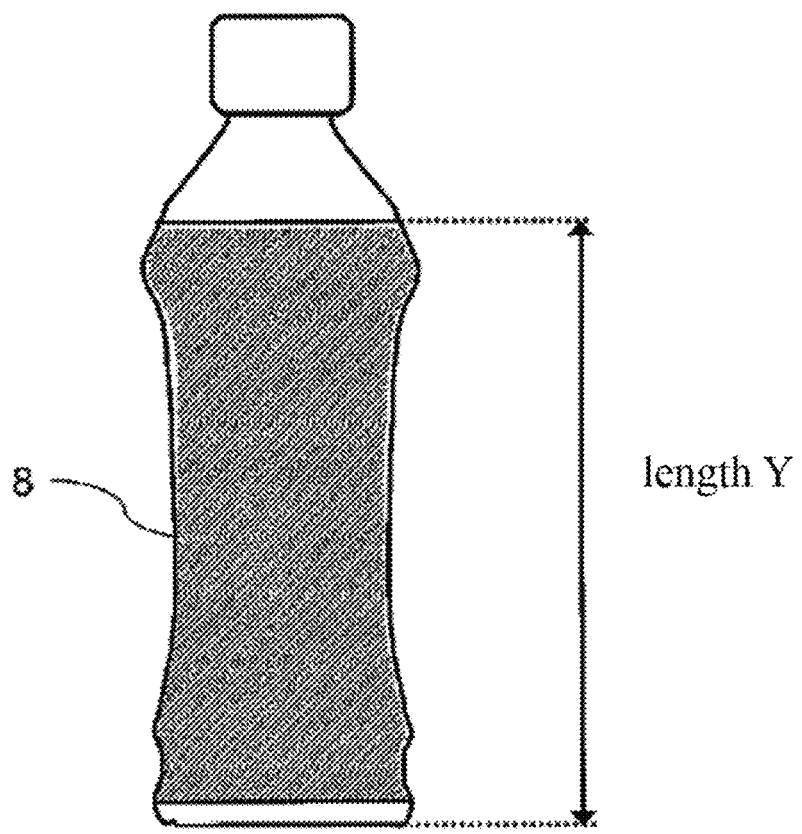
FIG. 5 shows a PET bottle with which film distortion is evaluated after shrinkage.

A film was wound around a 500 ml PET bottle (trunk diameter 62 mm, minimum diameter of neck part 25 mm) with the circumferential direction of the bottle as the main shrinkage direction (lengthwise direction) of the film, sealed by fusion sealing at 220° C., and heat-shrunk in a shrinking tunnel at a set temperature of 90° C. In FIG. 5, the length from the ground on which the bottle was put to the end of the label upper part was regarded as length Y, and the length Y was measured at every 5 mm pitch in the circumferential direction (lengthwise direction of the film). The difference between the maximum value and the minimum value of the length Y was defined as L. Those with large L were determined to have significant distortion after shrinkage. The criteria were as follows.

⊚: L≤1 mm
○: 1 mm<L≤2 mm
Δ: 2 mm<L≤3 mm
×: 3 mm<L

[Flaw in Surface]

(1) Detection of Flaw

Optical defects confirmed to be optically not less than 50 μm in dimension were detected for 16 film pieces.

The optical defect detection method was as follows. A fluorescent lamp of 20 W; 2 tubes 400 mm was placed under an XY table as a projector, and a specimen, an object to be measured, was put on a mask with a slit width of 10 mm placed on the XY table. When light enters in a manner that the angle between the line connecting the projector and an optical receiver and the vertical direction of the surface of the specimen is 12°, light is emitted at the light incident position of the specimen if a flaw exists at that position. The light quantity of that position is converted into an electric signal with a CCD image sensor camera installed 500 mm above the XY table, and the electric signal is amplified, differentiated, and compared with the threshold level with a comparator to output a detection signal of an optical defect. Further, using a CCD image sensor camera, the image of a flaw was input, and the input image video signal was analyzed by a prescribed procedure to measure the dimension of the optical defects and display the position of defects of 50 μm or larger. The optical defect detection was carried out on both faces of each specimen.

(2) Measurement of Dimension of Flaw

Defects by a flaw were selected from the optically defective portions detected in the above-described item (1). The specimen was cut into a proper dimension, and the surface of the specimen was observed from a perpendicular direction using a three-dimensional shape measurement apparatus TYPE 550 manufactured by MicroMap to measure the dimension of a flaw. When a specimen, that is the surface of a film, was observed from the perpendicular direction, the unevenness of a flaw in the vicinity within 50 μm was considered to be the same flaw, and the length and width of a rectangle with the minimum surface area covering the outermost part of the flaw were defined as the length and width of the flaw. The difference between the highest point and the lowest point of the flaw was defined as the depth, and the number of all the flaws (flaws/m$^2$) with a depth of not less than 1 μm and a length of not less than 3 mm was counted.

[Tensile Strength at Break]

A strip-like specimen with a length of 140 mm in the measurement direction (width direction of a film) and 20 mm in a direction orthogonal to the measurement direction (lengthwise direction of the film) was produced. While being held with chucks at both ends by 20 mm in each side (distance of 100 mm between the chucks), the specimen was subjected to a tensile test using a universal tension machine "DSS-100" (manufactured by Shimadzu Corporation) under conditions of an ambient temperature of 23° C. and a tension speed of 200 mm/min, and the strength (stress) at the time of tensile rupture was defined as the tensile strength at break.

[Thickness Unevenness in Lengthwise Direction]

A film was sampled in a long roll-like form having a dimension of a length of 30 m in the lengthwise direction and a width of 40 mm, and the thickness unevenness was measured at a speed of 5 (m/min) by using a continuous contact type thickness meter manufactured by MIKURON. In the sampling of the roll-like film specimen, the lengthwise direction of the film specimen was determined to be the main shrinkage direction of the film. The maximum thickness Tmax., the minimum thickness Tmin., and the average thickness Tave. at the time of measurement were measured, and the thickness unevenness in the lengthwise direction of the film was calculated according to the following equation 4.

$$\text{Thickness unevenness} = \{(T_{max.} - T_{min.})/T_{ave.}\} \times 100 \, (\%) \qquad \text{equation 4}$$

The polyesters used in examples and comparative examples are as follows.

Polyester 1: Polyethylene terephthalate (IV 0.75 dl/g)

Polyester 2: Polyethylene terephthalate (IV 0.75 dl/g) obtained by adding SiO$_2$ (Sylysia 266, manufactured by Fuji Silysia Chemical Ltd.) as a lubricant at a ratio of 8000 ppm to the polyester at the time of production of the above-mentioned polyester 1.

Polyester 3: Recycled raw material, "Clear Pellet", manufactured by Yono PET Bottle Recycling Co., Ltd. (IV 0.63 dl/g), and this polyester 3 contains 2 mol % of isophthalic acid in all of dicarboxylic acid components making up the polyester.

Polyester 4: Bio-polyester raw material (IV 0.62 dl/g) containing bio-derived ethylene glycol.

Regarding the polyester 4, a resin was prepared by the following production method. Magnesium acetate tetrahydrate was added in a proper amount to adjust the Mg atom content to be 70 ppm in the polyester to a mixture of terephthalic acid obtained by refining a raw material derived from petroleum and ethylene glycol obtained by refining a raw material derived from a plant, and esterification reaction was carried out at a temperature of 255° C. under a normal pressure. Thereafter, antimony trioxide in a proper amount to adjust the Sb atom content to be 280 ppm in the polyester and trimethyl phosphate in a proper amount to adjust the P atom content to be 40 ppm in the polyester were added, and the reaction was further carried out at a temperature of 260° C. Subsequently, the reaction product was transferred to a polycondensation reaction layer, and the reaction system was gradually decompressed while being heated and polycondensation was carried out at 280° C. under a reduced pressure of 133 Pa (1 mmHg) to obtain polyester chips of IV=0.62 dl/g. The biomass degree was measured, and it was found that the biomass degree was 17%.

Example 1

The above-mentioned polyester 1 and polyester 2 were mixed at a weight ratio of 93:7 and loaded to an extruder. Thereafter, the resin mixture was melted at 280° C. and extruded out of a T-die, and quenched by being wound around a rotating metal roll cooled to have a surface temperature of 30° C. to obtain an unstretched film with a thickness of 144 μm. The Tg of the unstretched film was 75° C. Thereafter, this unstretched film was introduced into a simultaneous biaxial stretching machine. After the unstretched film introduced into the tenter was then preliminarily heated until the film temperature reached 100° C., the film was stretched 4.0 times at 90° C. in the transverse direction and thereafter stretched 2.0 times at 90° C. in the vertical direction by widening the interval between the clips. At that time, the vertical stretching distance was 2000 mm. Further, at the time of the vertical stretching, the tenter width was narrowed by 10% after the transverse stretching to relax the film in the width direction. That is, the width shrinkage ratio at the time of vertical stretching was 10%. After the tentering, both edges were cut off and removed, and a biaxially stretched film of about 20 μm was continuously produced in a prescribed length to obtain a film roll of a heat-shrinkable polyester film. In a series of these film stretching and film production steps, the number of rolls at a temperature not less than Tg was 0. In these steps, no pinch roll was used. The characteristics of the obtained film were then evaluated by the above-mentioned methods. The evaluation results are shown in Table 2. As a result of the evaluations, the film was found to have sufficient shrinkage characteristics, good shrinkage finishing property, and few flaws.

found to have sufficient shrinkage characteristics, good shrinkage finishing property, and few flaws.

Example 4

The above-mentioned polyester 1 and polyester 2 were mixed at a weight ratio of 93:7 and loaded to an extruder. Thereafter, the resin mixture was melted at 280° C. and extruded out of a T-die, and quenched by being wound around a rotating metal roll cooled to have a surface temperature of 30° C. to obtain an unstretched film with a thickness of 136 μm. The Tg of the unstretched film was 75° C. Thereafter, this unstretched film was introduced into a transverse stretching machine. After the unstretched film introduced into the tenter was preliminarily heated until the film temperature reached 100° C., the film was stretched 4.0 times at 90° C. in the transverse direction. After the transverse stretching, the clips holding the film edges were opened in the tenter, and then the tension of the rolls

TABLE 2

| No. | thickness (μm) | heat shrinkage rate at 90° C.(%) (lengthwise direction) | heat shrinkage rate at 90° C.(%) (width direction) | thickness unevenness in the lengthwise direction (%) | tensile strength at break (MPa) (width direction) | orientation distortion index (°/m) | distortion by shrinkage (lunch box) distortion after shrinkage (center part) | distortion after shrinkage (end part) | distortion by shrinkage (PET bottle) distortion after shrinkage (center part) | distortion after shrinkage (end part) | flaw (flaw/m²) |
|---|---|---|---|---|---|---|---|---|---|---|---|
| Example 1 | 20 | 45 | 5 | 6 | 200 | 11 | ◎ | ○ | ◎ | ○ | 10 |
| Example 2 | 20 | 45 | 5 | 6 | 200 | 11 | ◎ | ○ | ◎ | ○ | 10 |
| Example 3 | 20 | 45 | 5 | 6 | 200 | 11 | ◎ | ○ | ◎ | ○ | 10 |
| Example 4 | 20 | 45 | 0 | 6 | 180 | 4 | ◎ | ◎ | ◎ | ◎ | 10 |
| Example 5 | 20 | 32 | 7 | 7 | 220 | 5 | ◎ | ◎ | ◎ | ◎ | 7 |
| Example 6 | 20 | 52 | −8 | 4 | 120 | 10 | ◎ | ○ | ◎ | ○ | 12 |
| Example 7 | 20 | 48 | −9 | 6 | 110 | 5 | ◎ | ◎ | ◎ | ◎ | 11 |
| Example 8 | 20 | 47 | −3 | 6 | 160 | 6 | ◎ | ◎ | ◎ | ◎ | 9 |
| Example 9 | 20 | 48 | −5 | 6 | 140 | 4 | ◎ | ◎ | ◎ | ◎ | 10 |
| Example 10 | 20 | 44 | −1 | 7 | 180 | 6 | ◎ | ◎ | ◎ | ◎ | 30 |
| Comparative Example 1 | 20 | 44 | −2 | 25 | 40 | 19 | ◎ | Δ | ◎ | Δ | 440 |
| Comparative Example 2 | 20 | 45 | 5 | 8 | 180 | 20 | ◎ | X | ◎ | X | 400 |

Example 2

A heat-shrinkable film was continuously produced by the method similar to that in Example 1, except that the polyester 3 and the polyester 2 were mixed at a weight ratio of 93:7 and loaded to an extruder. The Tg of the unstretched film was 75° C. Further, the width shrinkage ratio at the time of vertical stretching was 10%. Furthermore, the characteristics of the obtained film were evaluated by the methods similar to those in Example 1. The evaluation results are shown in Table 2. As a result of the evaluations, the film was found to have sufficient shrinkage characteristics, good shrinkage finishing property, and few flaws.

Example 3

A heat-shrinkable film was continuously produced by the method similar to that in Example 1, except that the polyester 4 and the polyester 2 were mixed at a weight ratio of 93:7 and loaded to an extruder. The Tg of the unstretched film was 75° C. Further, the width shrinkage ratio at the time of vertical stretching was 10%. Furthermore, the characteristics of the obtained film were evaluated by the methods similar to those in Example 1. The evaluation results are shown in Table 2. As a result of the evaluations, the film was installed near the tenter outlet was transmitted to the film in the tenter. The roll speed near the tenter outlet was set to be 2.0 times as fast as the speed of the clips of the tenter, so that the film was vertically stretched 2.0 times at 90° C. in the tenter. A cooling zone for positively cooling the film was formed before the tenter outlet to cool the film. The temperature of the film between the tenter outlet and the rolls was 55° C. The distance (vertical stretching distance) from the point at which the clips were opened to the rolls near the tenter outlet was 4000 mm. Further, pinch rolls were used to avoid excess shrinkage in the width direction of the film at the time of the vertical stretching. The shrinkage ratio in the width direction of the film at the time of vertical stretching was 15%. After the vertical stretching, both edges were cut off and removed, and a biaxially stretched film of about 20 μm was continuously produced in a prescribed length to obtain a film roll of a heat-shrinkable polyester film. In a series of these film stretching and film production steps, the number of rolls at a temperature not less than Tg was 0. The characteristics of the obtained film were evaluated by the above-mentioned methods. The evaluation results are shown in Table 2. As a result of the evaluations, the film was found to have sufficient shrinkage characteristics, good shrinkage finishing property, and few flaws.

Example 5

A heat-shrinkable film was continuously produced by the method similar to that in Example 4, except that the thickness of the unstretched film was changed to be 110 μm and the vertical stretch ratio was changed to be 1.5 times. The shrinkage ratio in the width direction of the film at the time of vertical stretching was 8%. The characteristics of the obtained film were evaluated by the methods similar to those in Example 1. The evaluation results are shown in Table 2. As a result of the evaluations, the film was found to have sufficient shrinkage characteristics, good shrinkage finishing property, and few flaws.

Example 6

A heat-shrinkable film was continuously produced by the method similar to that in Example 4, except that the thickness of the unstretched film was changed to be 150 μm and the vertical stretch ratio was changed to be 2.5 times. The shrinkage ratio in the width direction of the film at the time of vertical stretching was 25%. The characteristics of the obtained film were evaluated by the methods similar to those in Example 1. The evaluation results are shown in Table 2. As a result of the evaluations, the film was found to have sufficient shrinkage characteristics, good shrinkage finishing property, and few flaws.

Example 7

A heat-shrinkable film was continuously produced by the method similar to that in Example 4, except that the thickness of the unstretched film was changed to be 128 μm and no pinch roll was used at the time of vertical stretching. The shrinkage ratio in the width direction of the film at the time of vertical stretching was 30%. The characteristics of the obtained film were evaluated by the methods similar to those in Example 1. The evaluation results are shown in Table 2. As a result of the evaluations, the film was found to have sufficient shrinkage characteristics, good shrinkage finishing property, and few flaws.

Example 8

A heat-shrinkable film was continuously produced by the method similar to that in Example 4, except that the thickness of the unstretched film was changed to be 131 μm and the distance from the point at which the clips were opened to the rolls near the tenter outlet (vertical stretching distance) was changed to be 5000 mm. The shrinkage ratio in the width direction of the film at the time of vertical stretching was 18%. The characteristics of the obtained film were evaluated by the methods similar to those in Example 1. The evaluation results are shown in Table 2. As a result of the evaluations, the film was found to have sufficient shrinkage characteristics, good shrinkage finishing property, and few flaws.

Example 9

A heat-shrinkable film was continuously produced by the method similar to that in Example 4, except that the thickness of the unstretched film was changed to be 128 μm and the distance from the point at which the clips were opened to the rolls near the tenter outlet (vertical stretching distance) was changed to be 6000 mm. The shrinkage ratio in the width direction of the film at the time of vertical stretching was 20%. The characteristics of the obtained film were evaluated by the methods similar to those in Example 1. The evaluation results are shown in Table 2. As a result of the evaluations, the film was found to have sufficient shrinkage characteristics, good shrinkage finishing property, and few flaws.

Example 10

The above-mentioned polyester 1 and polyester 2 were mixed at a weight ratio of 93:7 and loaded to an extruder. Thereafter, the resin mixture was melted at 280° C. and extruded out of a T-die, and quenched by being wound around a rotating metal roll cooled to have a surface temperature of 30° C. to obtain an unstretched film with a thickness of 132 μm. The Tg of the unstretched film was 75° C. Thereafter, this unstretched film was introduced into a transverse stretching machine (a first tenter). After the unstretched film introduced into the tenter was preliminarily heated until the film temperature reached 100° C., the film was stretched 4.0 times at 90° C. in the transverse direction. After transverse stretching was carried out by the first tenter, the film was led to a tenter including rolls capable of applying tension installed at the inlet and the outlet. Without being held with clips at the end parts in the second tenter, the film was heated with hot air, and vertically stretched at 90° C. using the speed difference between the rolls at the inlet and the outlet in the second tenter. The speed difference was adjusted to 2.0 times, and pinch rolls were used to avoid excess shrinkage in the width direction of the film. A cooling zone for positively cooling the film before the outlet of the second tenter was formed to cool the film. The temperature of the film between the tenter outlet and the rolls was 55° C. The distance (vertical stretching distance) between rolls in the inlet and the outlet of the second tenter was adjusted to be 4000 mm, and the shrinkage ratio in the width direction of the film was 17%. After the vertical stretching, both edges were cut off and removed, and a biaxially stretched film of about 20 μm was continuously produced in a prescribed length to obtain a film roll of a heat-shrinkable polyester film. In a series of these film stretching and film production steps, the number of rolls at a temperature not less than Tg was 0. The characteristics of the obtained film were evaluated by the above-mentioned methods. The evaluation results are shown in Table 2. As a result of the evaluations, the film was found to have sufficient shrinkage characteristics, good shrinkage finishing property, and few flaws.

Comparative Example 1

The above-mentioned polyester 1 and polyester 2 were mixed at a weight ratio of 93:7 and loaded to an extruder. Thereafter, the resin mixture was melted at 280° C. and extruded out of a T-die, and quenched by being wound around a rotating metal roll cooled to have a surface temperature of 30° C. to obtain an unstretched film with a thickness of 40 μm. The Tg of the unstretched film was 75° C. Thereafter, the film was led to a vertical stretching machine in which a plurality of roll groups were continuously installed, and preliminarily heated on 10 preliminary heating rolls until the film temperature became 90° C., and subsequently stretched 2 times by using the speed difference between rolls. At that time, the stretching distance was 4 mm, and the shrinkage ratio in the width direction of the film was 2.0%. Thereafter, the vertically stretched film was forcedly cooled with cooling rolls set at a surface temperature of 25° C. In the film stretching and film production steps, the number of rolls at a temperature not less than Tg was 10. This stretching manner was defined as a stretching manner D, and the characteristics of the obtained film were evaluated by the above-mentioned methods. The evaluation results are shown in Table 2. As a result of the evaluations, the film was found to have sufficient shrinkage characteristics, but had inferior thickness unevenness and low tensile elongation at break in the width direction, and moreover was found to be distorted by shrinkage in samples of the end parts of the film and had many flaws.

Comparative Example 2

The polyester 1 and polyester 2 were mixed at a weight ratio of 93:7 and loaded to an extruder. Thereafter, the resin mixture was melted at 280° C. and extruded out of a T-die, and quenched by being wound around a rotating metal roll cooled to have a surface temperature of 30° C. to obtain an unstretched film with a thickness of 157 μm. The Tg of the unstretched film was 75° C. Thereafter, this unstretched film was introduced into a transverse stretching machine (a common tenter). Subsequently, after the unstretched film introduced into the tenter was preliminarily heated until the film temperature reached 100° C., the film was stretched 4.0 times at 90° C. in the transverse direction. Further, the film transversely stretched and subjected to the heat treatment was led to a vertical stretching machine in which a plurality of roll groups were continuously installed and preliminarily heated on 10 preliminary heating rolls until the film temperature became 90° C., and subsequently stretched 2 times by using the speed difference between rolls. At that time, the stretching distance was 4 mm and the shrinkage ratio in the width direction of the film was 2.0%. Thereafter, the vertically stretched film was forcedly cooled with cooling rolls set at a surface temperature of 25° C. Next, the film after the cooling was led to a tenter (a second tenter) and relaxed in the width direction by 5% while being subjected to a heat treatment at an ambient temperature of 90° C. for 8.0 seconds in the second tenter. After the second tentering, both edges were cut off and removed, and a biaxially stretched film of about 20 μm was continuously produced in a prescribed length to obtain a film roll of a heat-shrinkable polyester film. In a series of these film stretching and film production steps, the number of rolls at a temperature not less than Tg was 10. This stretching manner was defined as a stretching manner E and the characteristics of the obtained film were evaluated by the above-mentioned methods. The evaluation results are shown in Table 2. As a result of the evaluations, the film was found to have sufficient shrinkage characteristics but was found to be distorted by shrinkage in samples of the end parts of the film and had many flaws.

INDUSTRIAL APPLICABILITY

Since the heat-shrinkable polyester film of the present invention has excellent characteristics as described above, the heat-shrinkable polyester film can be used preferably for uses as labels of bottles and uses as banding films to be used for the purpose of bundling lunch boxes or the like, and the package for which the film is used as the label or the banding film has good appearance. Even in the case of containing a very slight content of a monomer component capable of serving as an amorphous component in the polyester, the film has a sufficient heat shrinkage ratio in the lengthwise direction, so that the ratio of a recycled raw material can be increased. Thus, the film is desirable from an environment aspect, and moreover has very few flaws in the surface, and is excellent in the appearance.

DESCRIPTION OF THE NUMERALS

1: tenter
2: clip opener
3: clip
4: stretched film
5: roll
6: plastic container (body)
7: plastic container (cover)
8: film

The invention claimed is:

1. A heat-shrinkable polyester film comprising ethylene terephthalate as a main component, containing not less than 0 mol % and not more than 5 mol % of a monomer component capable of serving as an amorphous component relative to the total of a polyester resin component, and having a main shrinkage direction in a lengthwise direction, wherein the heat-shrinkable polyester film satisfies the following requirements (1) to (3):
(1) the heat-shrinkable polyester film has a hot-water heat shrinkage rate in the lengthwise direction of not less than 15% and not more than 60% when being treated in hot water at 90° C. for 10 seconds;
(2) the heat-shrinkable polyester film has a hot-water heat shrinkage rate in a width direction orthogonal to the lengthwise direction of not less than −10% and not more than 10% when being treated in hot water at 90° C. for 10 seconds; and
(3) the heat-shrinkable polyester film has an orientation distortion index that is a molecular orientation angle difference, the difference being a difference between a molecular orientation angle of an edge of one end in the width direction and a molecular orientation angle of an edge of the other end, per 1 m of the film of not more than 15°/m.

2. The heat-shrinkable polyester film according to claim 1, wherein the heat-shrinkable polyester film has, in a surface thereof, not more than 100 flaws/m$^2$ with a depth of not less than 1 μm and a length of not less than 3 mm.

3. The heat-shrinkable polyester film according to claim 1, wherein a thickness unevenness in the lengthwise direction of the heat-shrinkable polyester film is not more than 10%.

4. The heat-shrinkable polyester film according to claim 1, wherein the heat-shrinkable polyester film has a tensile strength at break in the width direction orthogonal to the main shrinkage direction of not less than 80 MPa and not more than 200 MPa.

5. The heat-shrinkable polyester film obtained by stretching an unstretched film in a width direction and thereafter stretching the film in a lengthwise direction, and satisfying claim 1, wherein the heat-shrinkable polyester film is stretched in the lengthwise direction without using a roll heated to a temperature not less than Tg of the film.

6. A package obtained by using the heat-shrinkable polyester film according to claim 1 as a base material for a label or a banding film, wherein the label or the banding film is covered on at least a portion of an outer circumference and heat-shrunk.

* * * * *